E. M. HEYLMAN.
PLANTER.
APPLICATION FILED DEC. 18, 1918.

1,302,922.

Patented May 6, 1919.
2 SHEETS—SHEET 1.

Witnesses
E. J. Nottingham
G. F. Downing

Inventor
E. M. Heylman
By Seymour & Bright
Attorneys

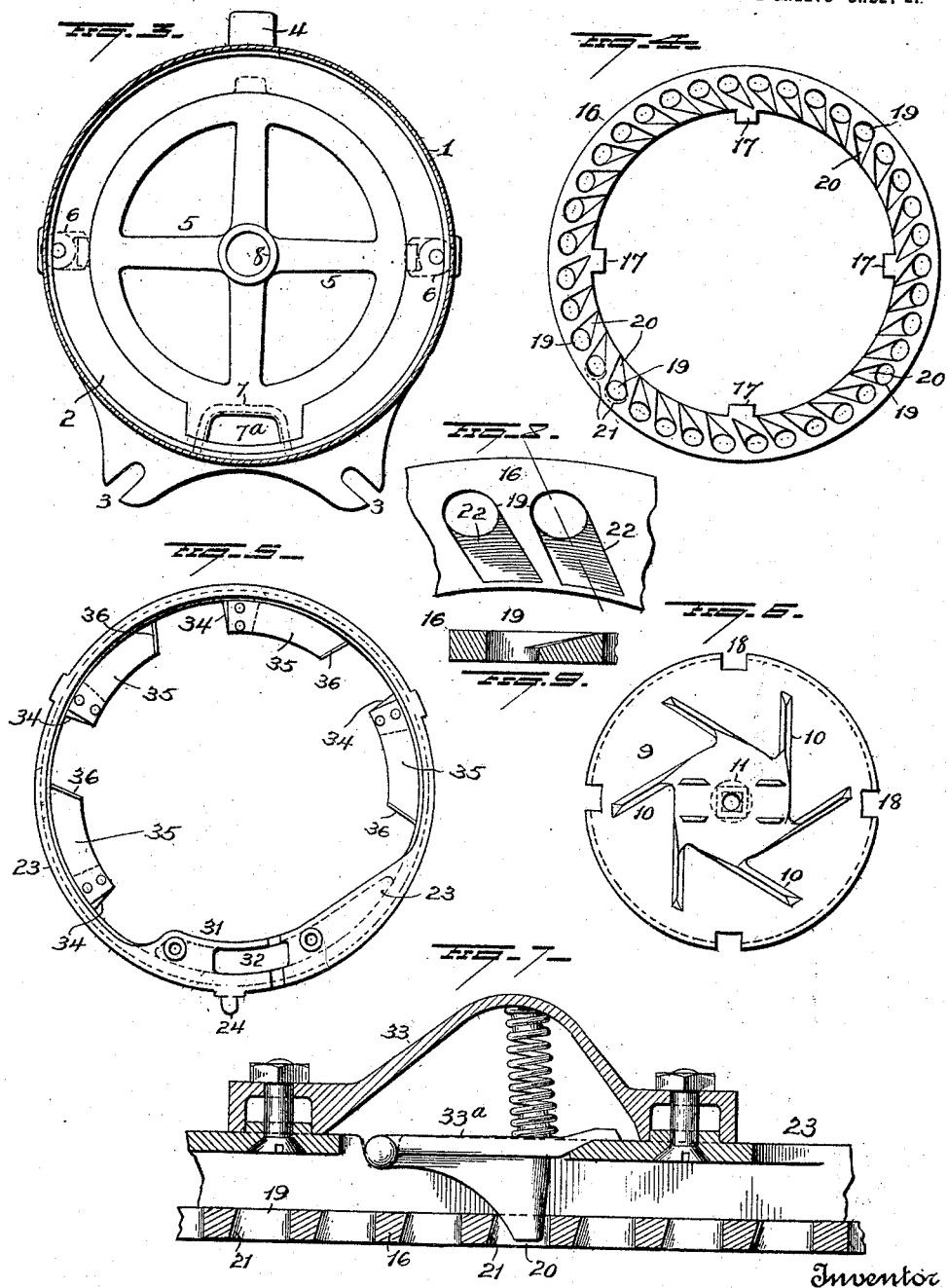

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

PLANTER.

1,302,922.        Specification of Letters Patent.        Patented May 6, 1919.

Application filed December 18, 1918. Serial No. 267,300.

*To all whom it may concern:*

Be it known that I, EDWARD M. HEYLMAN, a citizen of the United States, and a resident of South Bend, in the county of St. Joseph and State of Indiana, have invented certain new and useful Improvements in Planters; and I do hereby declare the following to be a full, clear, and exact description of the invention, such as will enable others skilled in the art to which it appertains to make and use the same.

This invention relates to improvements in planters and more particularly to feed devices therefor,—one object of the invention being to provide simple and efficient means which shall facilitate the accurate feeding of the seed, without injury to the latter and without crowding and jamming, to the discharge outlet.

A further object is to provide means which shall facilitate the removal of the feed ring and the replacing of another feed ring with seed cells or openings of a different size.

With these and other objects in view, the invention consists in certain novel features of construction and combinations of parts as hereinafter set forth and pointed out in the claims.

Figure 1:
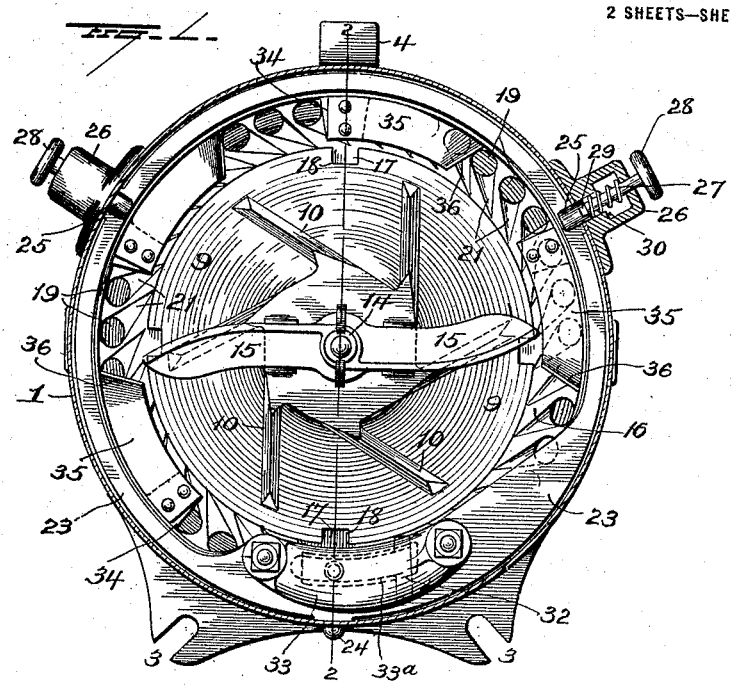
Figure 2:
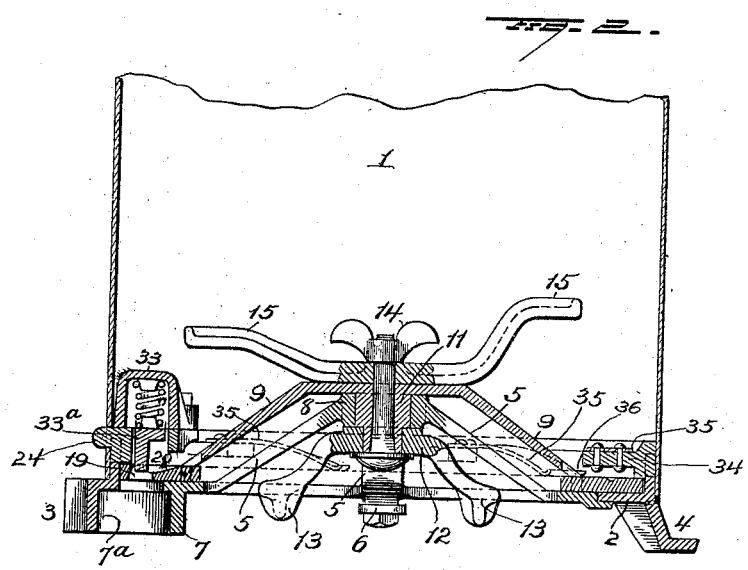

In the accompanying drawings; Figure 1 is a plan view of a feed mechanism embodying my improvements, the seed can being shown in section; Fig. 2 is a sectional view on the line 2—2 of Fig. 1; Figs. 3 to 7 are views of details, and Figs. 8 and 9 views of a modification of the feed ring.

1 represents a seed can, the wall of which is secured at its lower end to a bottom ring 2, and the latter is provided with lugs 3, 3 and 4 to facilitate the attachment of the can and parts supported thereby, to suitable supporting means on a planter. Within the bottom ring, a spider 5 is located and supported by removable or adjustable buttons 6 attached to said ring. The spider is also made with a recessed enlargement 7 to enter a recess in the bottom ring and form a discharge outlet 7ª. The arms of the spider project upwardly and inwardly within the lower portion of the seed can and converge to a central ring or sleeve 8. An agitator plate made in the form of a truncated cone 9 having ribs 10, is disposed over the spider and provided centrally with a tubular hub 11 which passes freely through the ring or sleeve 8 of the spider. The lower end of the hub 11 is made angular and on this portion of said hub, a casting 12 having arms 13 is placed and adapted to be engaged by propelling mechanism (not shown) for operating the feed devices. A bolt passes through the hub 11 and serves to hold the casting 12 in place, said bolt projecting above the cone and threaded for the reception of a nut 14, which latter serves to secure stirrer arms 15 to said cone. It will thus be apparent that the cone is rotatably mounted within the lower portion of the seed can.

The bottom ring 2 supports a rotatable feed ring 16, said ring surrounding the peripheral portion of the cone and provided interiorly with lugs 17 to enter notches 18 in the cone, and thus the feed ring is rotatable by and with the cone.

The feed ring is made with an annular series of seed cells or openings 19 which may be oval in shape and each having its rear wall 20 somewhat beveled. By the "rear" wall of each seed cell or opening, is meant that wall which is in the rear with respect to the direction of rotation of the feed ring. The feed ring is also made in its upper face with grooves 21 which extend diagonally from the seed cells or openings toward the inner edge of the plate and terminate in proximity to such inner edge. That is to say, the grooves 21 extend in an inward and forward direction from the seed cells or openings and are made slanting or tapering from said openings to their forward extremities where they terminate at the surface of the ring in proximity to the inner edge thereof. Said grooves 21 may also be made tapering from end to end as shown in Fig. 1 and thus said grooves 21 may be tapering in both directions.

Instead of making the grooves tapering from end to end as shown in Fig. 1 they may be made straight with parallel side edges as shown at 22 in Fig. 8 but in this form of the device the inclined or tapering bottoms of the grooves will be retained.

A ring 23 (which may be termed a "cutoff" ring) is disposed over the feed ring and is prevented from rotating by means of a pin 24 entering a hole in the wall of the seed can. The ring 23 is also held in place by means of bolts or latches 25. These bolts are mounted in housings 26 secured to the outer wall of the seed can and are normally projected over the cut-off ring 23, by means of spring 27. Each bolt or latch 25 is provided with a head or finger-hold 28 for withdrawing it, and each bolt or latch is made with lugs 29 adapted, when the bolt is withdrawn and turned, to become disposed behind shoulders 30 within the housing 26. By these means, the ring 23 may be easily released, when it may be removed and permit the easy removal of the feed ring and replacement of another feed ring having seed cups of a different size, whereby the mechanism may be made adaptable for feeding either cotton or corn.

The ring 23 is made with an enlargement 31 having an opening 32. This opening is covered by a cap 33 and this cap also incloses a spring-pressed finger 33ª mounted in said opening 32 and adapted to force seed from the seed cups of the feed ring to the discharge outlet 7ª at the bottom of the seed can.

The ring 23 is provided with a plurality of inwardly projecting lugs 34 to which spring sweeps or fingers 35 are secured. Each of these sweeps or fingers may be made of flat spring metal, curved slightly so as to be concentric with the ring and bent downwardly so that its free end portion will wipe over the upper face of the feed ring. The free end of each sweep or finger 35 is beveled so as to be disposed diagonally across the feed ring and this beveled end is bent upward slightly to form a lip 36.

With my improvements, when the feed ring is rotated so that the same will turn in the direction in which the grooves 21 extend from the seed cells, said ring will move under the spring sweeps 35 and the latter will serve to cause the seed to move outwardly through said grooves to the seed cells and clogging or jamming of the seed in the cells will be prevented.

Slight changes might be made in the details of my invention without departing from the spirit thereof or limiting its scope and hence I do not wish to restrict myself to the precise details herein set forth.

Having fully described my invention what I claim as new and desire to secure by Letters-Patent, is:—

1. In feed mechanism for planters, the combination with a seed can, of a rotatable feed member having an annular series of seed cells, said feed member also having in its upper face grooves which extend inwardly and forwardly from said seed cells, said grooves being made inclined upwardly from said cells toward the upper face of the feed member.

2. In feed mechanism for planters, the combination with a seed can, of a feed ring having an annular series of seed cells, said ring also having grooves in its upper face, said grooves extending forwardly and inwardly from the seed cells and inclined downwardly approximately from the inner edge of the ring to said seed cells.

3. In feed mechanism for planters, the combination with a seed can, of a rotatable feed ring having seed cells and having inclined grooves extending forwardly and inwardly from said seed cells, and a stationary spring sweep over said feed ring and having a beveled free end disposed in proximity to said ring.

4. In feed mechanism for planters, the combination with a seed can, of a rotatable feed ring having seed cells and having inclined grooves extending inwardly and forwardly from said cells, a stationary ring over said feed ring, and a plurality of sweeps secured to said stationary ring and having beveled free ends to sweep over the feed ring.

5. In feed mechanism for planters, the combination with a seed can, of a rotatable feed ring having seed cells, a normally stationary cut off ring disposed over the feed ring, a manually operable spring-pressed bolt projecting over the cut-off ring, a housing for said bolt, said housing having an internal shoulder, and a lug on said bolt to engage said shoulder and retain the bolt withdrawn, whereby the removal of the cut-off ring and the feed ring will be facilitated.

6. In feed mechanism for planters, the combination with a seed can provided with a bottom ring, an agitator cone, a rotatable feed ring between said cone and the wall of the seed can and connected with said cone, means whereby said cone and feed ring may be rotated, a normally stationary ring removably supported over the feed ring, and a plurality of spring sweeps disposed within and carried by said normally stationary ring, said spring sweeps having beveled free ends disposed in close proximity to the upper face of the feed ring.

In testimony whereof, I have signed this specification in the presence of two subscribing witnesses.

EDWARD M. HEYLMAN.

Witnesses:
EDWIN NICAR,
GEORGE LANPHERE.